US005726221A

United States Patent [19]
Alexiou

[11] Patent Number: 5,726,221
[45] Date of Patent: Mar. 10, 1998

[54] CORRECTION FLUIDS

[75] Inventor: Michael Alexiou, Twickenham, United Kingdom

[73] Assignee: The Gillette Company, Boston, Mass.

[21] Appl. No.: 728,445

[22] Filed: Oct. 10, 1996

Related U.S. Application Data

[62] Division of Ser. No. 347,413, Dec. 1, 1994, Pat. No. 5,594,045.

[30] Foreign Application Priority Data

Jun. 3, 1992 [GB] United Kingdom ............... 9211760

[51] Int. Cl.$^6$ ............................................. C09D 10/00
[52] U.S. Cl. ................... 523/161; 524/236; 524/425; 524/432; 524/444; 524/497; 524/503; 524/556; 524/557; 427/140; 106/31.64; 106/31.93
[58] Field of Search ................ 523/161; 106/19 A, 106/20 A, 31.64, 31.93; 427/140; 524/236, 425, 432, 444, 497, 503, 556, 557

[56] References Cited

U.S. PATENT DOCUMENTS

| | | | |
|---|---|---|---|
| 2,084,918 | 6/1937 | Nelson | 106/445 |
| 3,356,627 | 12/1967 | Scott | 524/516 |
| 3,637,565 | 1/1972 | Sheetz | 524/816 |
| 3,674,729 | 7/1972 | Mirick | 524/556 |
| 3,847,857 | 11/1974 | Haag et al. | 524/530 |
| 3,875,105 | 4/1975 | Daugherty et al. | 523/161 |
| 3,926,890 | 12/1975 | Huang et al. | 524/551 |
| 3,985,663 | 10/1976 | Lu et al. | 430/115 |
| 3,997,498 | 12/1976 | Reese et al. | 523/161 |
| 4,043,820 | 8/1977 | Landau | 106/21 A |
| 4,165,988 | 8/1979 | Page et al. | 106/23 B |
| 4,228,028 | 10/1980 | Lin | 252/182.12 |
| 4,248,754 | 2/1981 | Fox et al. | 524/377 |
| 4,290,072 | 9/1981 | Mansukhani | 347/101 |
| 4,308,186 | 12/1981 | Schreura et al. | 524/389 |
| 4,352,901 | 10/1982 | Maxwell et al. | 524/38 |
| 4,399,254 | 8/1983 | Das et al. | 524/745 |
| 4,507,422 | 3/1985 | Farrar et al. | 524/425 |
| 4,554,307 | 11/1985 | Farrar et al. | 524/425 |
| 4,654,081 | 3/1987 | Dalzell | 524/145 |
| 4,655,834 | 4/1987 | Haruta et al. | 106/20 D |
| 4,695,528 | 9/1987 | Dabisch et al. | 430/290 |
| 4,732,614 | 3/1988 | Brooks et al. | 106/21 A |
| 4,740,549 | 4/1988 | Okuzono et al. | 524/379 |
| 5,256,191 | 10/1993 | Thompson et al. | 106/19 A |
| 5,332,599 | 7/1994 | Sanborn | 427/259 |
| 5,338,775 | 8/1994 | Matz et al. | 523/161 |
| 5,370,922 | 12/1994 | Sanborn et al. | 428/201 |
| 5,514,450 | 5/1996 | Sanborn et al. | 428/204 |
| 5,578,117 | 11/1996 | Matz et al. | 106/19 A |

FOREIGN PATENT DOCUMENTS

| | | |
|---|---|---|
| 254586A | 3/1988 | Germany . |
| 3919588A | 12/1989 | Germany . |
| 58-49761 | 3/1983 | Japan . |
| 58-162674A | 9/1983 | Japan . |
| 59-131675 | 7/1984 | Japan . |
| 60-068996 | 4/1985 | Japan . |
| 60-250990 | 12/1985 | Japan . |
| 61-174274A | 8/1986 | Japan . |
| 1254962 | 10/1989 | Japan . |
| 01292074A | 11/1989 | Japan . |
| 2097568 | 4/1990 | Japan . |
| 2097570 | 4/1990 | Japan . |
| 297574 | 4/1990 | Japan . |
| 02129274A | 5/1990 | Japan . |
| 02169678A | 6/1990 | Japan . |
| 02209973A | 8/1990 | Japan . |
| 02263876A | 10/1990 | Japan . |
| 03031375A | 2/1991 | Japan . |
| 891730 | 12/1981 | U.S.S.R. . |
| WO 92/07039 | 4/1992 | WIPO . |

OTHER PUBLICATIONS

"Correction fluid for Dye Based Ink Print", Abstract 18/82, Research Disclosure, May, 1979.
Alince, "Performance of cationic latex as a wet-end additive," *Tappi* vol. 60 12:133–136 (Dec. 1977).

*Primary Examiner*—Vasu Jagannathan
*Assistant Examiner*—John J. Guarriello
*Attorney, Agent, or Firm*—Fish & Richardson P.C.

[57] ABSTRACT

Water-based correction fluids for covering typing, writing or drawing errors contain a particulate opacifier, a water-soluble or water-dispersible binder, water and a di- or tri-quaternary ammonium compound to prevent bleed of inks.

14 Claims, No Drawings

CORRECTION FLUIDS

This is a divisional of application Ser. No. 08/347,413, filed Dec. 1, 1994, now U.S. Pat. No. 5,594,045.

This invention is concerned with correction fluids, that is white paints which are used by typists and others to cover typing, writing and drawing errors and which, when dry, can be typed, written or drawn over.

Correction fluids essentially comprise an opacifying agent, usually a white pigment, such as titanium dioxide, a polymeric binder, and a liquid medium in which the binder is soluble or dispersible. The composition usually also contains a dispersing agent. Such compositions are of two kinds. In the first kind the liquid medium is a volatile organic solvent. Such as a chlorohydrocarbon, a chlorofluorocarbon or a petroleum-based hydrocarbon, and in the second kind the liquid medium is water-based, for example a water/ethanol mixture.

There is a general movement and, in some countries, a positive requirement, to avoid the use of organic solvent-containing compositions for environmental reasons and/or to reduce the incidence of solvent abuse. The present invention is concerned with correction fluids of the second kind, that is containing water as the liquid medium.

The water-based correction fluids that are currently available are entirely satisfactory with typewriter and printer inks since these are based on waxes and greases, that is they are non-aqueous. Water-based correction fluids are not generally satisfactory with ball point pen inks even though the latter are based on greases since certain of the dyes used in such inks have a residual water-solubility. Such correction fluids are also unsatisfactory with markings made with water-based inks.

When water-based correction fluids are used on markings made with water-based inks or with ball point pens, it is found that although the coating of the correction fluid initially appears to cover and obscure the markings, the latter show through before or after the coating is completely dry. This phenomenon is referred to as "bleeding" and is due to the water in the correction fluid solubilising the dye or dyes present in the ink of the marking.

A variety of dyes are used in water-based inks and ball point pen inks and the problem of bleeding appears to be particularly bad with inks containing anionic dyes.

There have been various proposals for dealing with the problem of "bleeding" in water-based correction fluids. In one proposal, described in WO 92/07039, there is used as the polymeric binder of the correction fluid a cationically effective film-forming material, especially an acrylate polymer, to bind with the anionic dye to prevent "bleeding". However, there are few suitable such film-forming materials and their use limits considerably the possible variations in formulation of the fluids which are generally desirable. Another proposal, described in Research Disclosure, May 1979, item 18182 (anonymous), also suggests the use in a correction fluid of a cationic material to bind with the anionic dye, but in this case the cationic material is contributed by polymeric or other water-soluble materials such as quaternary ammonium surfactants. The only example given is the use of a cationic polymeric compound SOLIDIGEN LT-13, described as a proprietary material supplied by General Aniline and Film Corp.

We have now found that there is a particular narrow group of quaternary ammonium compounds which are especially satisfactory in water-based correction fluids for preventing "bleeding". These compounds are capable of reacting rapidly with and insolubilising the anionic dyes used in such inks, whilst not significantly limiting the choice of other components of the compositions.

According to one aspect of the present invention, therefore, there is provided a water-based correction fluid, which comprises a particulate opacifier, a water-soluble or water-dispersible polymeric binder, water and a di- or tri-quaternary ammonium compound of the formula:

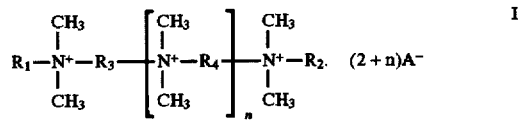

where $R_1$ and $R_2$, which may be the same or different, are substituted or unsubstituted aliphatic groups containing from 4 to 20 carbon atoms, $R_3$ and $R_4$, which may be the same or different, are substituted or unsubstituted alkylene groups containing up to 8 carbon atoms, which groups may be interrupted by one or more ethereal oxygen atoms. A is an artion, and n is 0 or 1.

The compounds of formula I are either known or are close analogues of known compounds, although we are not aware of any prior proposal to use these compounds for the purpose with which the invention is concerned. These compounds can be prepared by methods which have been published in the literature or by adaptations of such methods which will be apparent to those skilled in the art.

Preferred compounds of formula I for use in accordance with the invention are compounds in which $R_1$ and $R_2$ are both $-C_8H_{17}$, $-C_{10}H_{21}$, $-C_{12}H_{25}$, $-C_{14}H_{29}$, or $-C_{18}H_{37}$, $R_3$ and $R_4$ are both $-C_2H_4-$ or $-C_3H_6-$, and $A^-$ is a chloride or $R_3$ and $R_4$ are both $-C_2H_4-$ or $-C_3H_6-$, and $A^-$ is a chloride or bromide anion. The groups $R_1$, $R_2$, $R_3$ and $R_4$ can each independently be substituted such as by one or more hydroxyl groups or halogen atoms, for example.

It is usually preferred to use diquaternary ammonium compounds (I, n=0), rather than tri-quaternary ammonium compounds (I, n=1).

Specific diquaternary compounds which have been prepared and used and which are effective for the purpose indicated, are as follows (in these compounds, $R_1=R_2$; $R_3=-C_2H_4-$; and n=0):

| | $R_1/R_2$ | m.p. |
|---|---|---|
| N,N'-dioctyl-N,N,N',N'-tetramethylethylenediamine dibromide | $C_8H_{17}$ | 150° C. |
| N,N'-didecyl-N,N,N',N'-tetramethylethylenediamine dibromide | $C_{10}H_{21}$ | 153° C. |
| N,N'-didodecyl-N,N,N',N'-tetramethylethylenediamine dibromide | $C_{12}H_{25}$ | 168° C. |
| N,N'-ditetradecyl-N,N,N',N'-tetramethylethylenediamine dibromide | $C_{14}H_{29}$ | 168° C. |
| N,N'-dioctadecyl-N,N,N',N'-tetramethylethylenediamine dibromide | $C_{18}H_{37}$ | 170° C. (decomp) |

Whilst the above terminology is used in the present specification, it will be clear to those skilled in the art that alternative terminology can be used: for example, the ditetradecyl compound can be named 1,2-ethanediaminium-N,N-dietetradecyl-N,N,N',N'-tetramethyl dibromide.

An example of a useful ether is N,N'-didecyl-N,N,N',N'-tetramethyl-1,5 (3-oxapentylene) diammonium dichloride. An example of a useful triquaternary compound is N,N',N"-trioctyl-N,N,N',N',N"-pentamethyldiethylenetriamine tribromide.

The diquaternary ammonium compounds of formula I (n=0) in which $R_1$ and $R_2$ are the same may be prepared by condensing an excess of an alkyl halide of the formula $R_1X$, where X is a halogen atom, with an N,N'-tetramethylalkylenediamine of the formula:

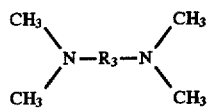

where $R_3$ has the above-stated meaning. Since two moles of the alkyl halide are required per mole of the tetramethylalkylenediamine, the excess should be in excess of two moles. This reaction will give rise to a diquaternary ammonium compound of formula I in which $A^-$ is the halide ion, $X^-$. Preferred compounds of formula I are those in which $A^-$ is a chloride or bromide ion. Compounds containing other anions, that is other than halides, can be made by treating the product of the condensation reaction with an excess of a salt containing the desired anion.

The condensation reaction is preferably carried out by simply heating a mixture of the two reactants where one or both of them is a liquid. Where neither is a liquid either at room temperature or at the elevated temperature used for the reaction, an inert organic solvent, for example toluene, is preferably used as the reaction medium.

Suitable temperatures for the condenstation reaction are, for example, from 80° to 90° C. and the reaction time is typically about 16 hours.

The product usually precipitates out of the liquid reaction mixture and, where no organic solvent is used, the reaction mixture becomes a solid mass. The desired product is obtained by recrystallisation, for example from methyl ethyl ketone, or by any other suitable procedure.

As already indicated, we have found that the di- and tri-quaternary ammonium compounds of formula I are capable of effectively insolubilising the anionic dyes used in water-based inks. The correction fluids in which they are used preferably comprise, by weight:

|  |  |
|---|---|
| opacifier | 40–70% |
| polymeric binder | 1–10% |
| water | 25–30% |
| di- or tri-quatemary ammonium compound | 1–10% |
| dispersing agent | 0.1–5% |

The nature and preferred examples of these components and of other optional components will now be further described.

The opacifier may be any of those conventionally used in correction fluids. Titanium dioxide pigment is preferred, for example the grades Ti Pure R900 and Ti Pure R700 supplied by du Pont and the grade KCL-535 supplied by SCM Chemicals.

In addition to the opacifier, the correction fluid may, and preferably does, contain an inert filler which has some covering power, but is Less expensive than titanium dioxide. Suitable fillers for this purpose include, for example, calcium carbonate and hollow microspheres of hydrated alumina (commercially available under the Trade Mark "Spacerite"), of alumina-silica alloy (commercially available under the Trade Mark "Zeospheres"), and of acrylate-styrene copolymer (commercially available under the Trade Mark "Ropaque OP-62"). The composition may contain up to 30% by weight of one or more of such fillers and preferably contains from 10 to 20% by weight.

It can be advantageous to include zinc salts in the correction fluids of the invention. A preferred combination is zinc oxide with a small amount of zinc acetate activator. The zinc compounds form a cement in the correction fluid as it dries. Typical amounts of zinc compounds would be about 20% zinc oxide and about 0.5% zinc acetate.

The polymeric binder should, as previously indicated, be water-soluble or water-dispersible and it should not interact with the cationic materials present in the composition. A preferred polymeric binder is polyvinyl alcohol; material which is 80% hydrolysed and which has a molecular weight of about 125000 is particularly preferred.

Aqueous dispersions and solutions of acrylic polymers stabilised by non-ionic or cationic surfactants are also suitable, for example "Plextol B500" and "Plex 4739L" (Trade Marks) supplied by Rohm.

Aqueous dispersions of polyurethanes stabilised by cationic surfactants are also suitable, for example YA-110-5 supplied by Witco Corp.

Aqueous dispersions of polyvinyl acetate (usually copolymerised with minor amounts of dimethylamino ethyl methacrylate) can be used.

It is particularly preferred to use up to 5% by weight of the polymeric binder.

As indicated, the correction fluid according to the invention preferably comprises from 1 to 5% of a dispersing agent. This component is preferably present not only to maintain the opacifier in suspension, but also to reduce the viscosity of the fluid so that it is of a readily paintable consistency. The dispersing agent used should be one which is compatible with the cationic materials present.

Preferred dispersing agents are cocamine acetate such as that available under the Trade Mark "Armac C" from Akzo Chemie and acrylic graft copolymers such as that available under the Trade Mark "Hypermer CG-6" from ICI.

Water-based inks may also contain cationic dyes and ball point pen inks may contain solvent dyes which have a residual water solubility such as to cause bleed through. In order to insolubilise these two types of dye, the correction fluid preferably contains a cationically modified clay and/or powdered polyacrylonitrile, both of which physically adsorb and thus insolubilise cationic dyes. A suitable cationically modified clay is, for example, the SD 903 material (known as Macrosorb AX 300) available from Crosfield Chemicals and a suitable polyacrylonitrile powder is available from Aldrich Chemical Co.

The proportion of such an adsorbent present in the correction fluid is preferably up to 10% by weight, more preferably from 4 to 7% by weight.

In order that the invention may be more fully understood, the following examples, in which all the percentages are by weight, are given by way of illustration only:

EXAMPLE 1

A correction fluid of the following composition was made up:

|  | % |
|---|---|
| titanium dioxide (Ti-Pure R900) | 56.31 |
| polyvinyl alcohol (80% hydrolysed; MW 125000) | 0.97 |
| water | 39.81 |
| N,N'-ditetradecyl-N,N,N',N'-tetramethylethylenediamine dibromide | 2.91 |

The correction fluid was applied by a brush in the conventional way to markings on paper which had been made with a water-based ink containing anionic dyes, so as to cover the markings. The correction fluid dried in approximately 60 seconds to form an opaque white film on the paper completely hiding the markings. There was no bleed through.

The white film could be written on as soon as it was dry.

EXAMPLE 2

Correction fluids were made up of the composition described in Example 1 except that the N,N'-ditetradecyl-N,N,N',N'-tetramethylethylenediamine dibromide was replaced by, respectively, the corresponding dioctyl, didecyl, didocyl and dioctadecyl compounds. Also, a composition was made containing N,N'-methylene his (dimethyltetradecylammonium bromide). When tested as described in Example 1, the fluids showed antibleed activity and the white films produced could be written on as soon as they were dry.

EXAMPLE 3

A correction fluid of the following composition was made up:

|  | % |
| --- | --- |
| titanium dioxide (Ti-Pure R900) | 60.31 |
| acrylic polymer binder (Plex 4739L solution) | 12.90 |
| water | 15.25 |
| N,N'-didodecyl-N,N,N',N'-tetramethylethylenediamine dibromide | 3.24 |
| acrylic graft copolymer dispersant (Hypermer CG-6) | 8.30 |

The correction fluid was used in the same way as in Example 1 to cover markings on paper which had been made with a water-based ink containing anionic dyes. Similar results were obtained; there was no bleed through.

EXAMPLE 4

A correction fluid of the following composition was made up:

|  | % |
| --- | --- |
| titanium dioxide (Ti-Pure R900) | 28.7 |
| zinc oxide b.p. | 19.1 |
| zinc acetate | 0.5 |
| water | 22.0 |
| quaternary ammonium compound | 10.3 |
| Hypermer CG-6 | 10.5 |
| Vinamul V90061 | 8.8 |
| Foamaster 8034 | 0.1 |

The quaternary ammonium was N,N',N''-trioctyl-N,N,N', N',N''-pentamethyldiethylenetriamine tribromide. When tested as in Example 1, the fluid formed an opaque white coating with non-bleed activity.

I claim:

1. A method of covering an ink marking on a substrate, comprising applying to said marking a correction fluid comprising a particulate opacifier, a water-soluble or water-dispersible polymeric binder, water and a di- or tri-quaternary ammonium compound of the formula:

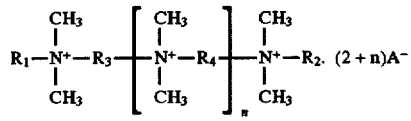

where $R_1$ and $R2$, which may be the same or different, are substituted or unsubstituted aliphatic groups containing from 4 to 20 carbon atoms, $R_3$ and $R4$, which may be the same or different, are substituted or unsubstituted alkylene groups containing up to 8 carbon atoms, which groups may be interrupted by one or more ethereal oxygen atoms, wherein A is an anion, and n is 0 or 1.

2. The method of claim 1, in which, in said compound $R_1$ and $R_2$ are both $-C_8H_{17}$, $-C_{10}H_{21}$, $-C_{12}H_{25}$, $-C_{14}H_{29}$, or $-C_{18}H_{37}$, $R_3$ and $R_4$ are both $-C_2H_3-$ or $-C_3H_6-$, and $A^-$ is a chloride or bromide anion.

3. The method of claim 1, which comprises, by weight, from 40 to 70% of opacifier, from 1 to 10% of polymeric binder, from 25 to 30% of water, and from 1 to 10% of di- or tri-quaternary ammonium compound.

4. The method of claim 1 in which the opacifier is titanium dioxide.

5. The method of claim 1 which additionally comprises up to 30% by weight of an inert filler.

6. The method of claim 5, in which the inert filler is powdered calcium carbonate or hollow microspheres of hydrated alumina, alumina-silica alloy, or acrylate-styrene copolymer.

7. The method of claim 1 further including zinc oxide and zinc acetate.

8. The method of claim 1 wherein the polymeric binder is polyvinyl alcohol or a water-dispersible or -soluble acrylic polymer or polyurethane.

9. The method of claim 8 which comprises from 1 to 5% by weight of the polymeric binder.

10. The method of claim 1 which additionally comprises from 1 to 5% by weight of a dispersing agent which is compatible with the cationic materials present.

11. The method of claim 1 which additionally comprises up to 10% by weight of a cationically modified clay and/or powdered polyacrylonitrile.

12. The method of claim 1 in which said ink marking comprises ball-pen ink.

13. The method of claim 1, said correction fluid drying after application, said method further comprising applying a corrective marking to said dried correction fluid.

14. The method of claim 1 in which said ink marking comprises an aqueous ink containing an anionic dye.

* * * * *